Jan. 9, 1934.  C. G. NAYLOR  1,943,035
METHOD OF PRODUCING TUBING OR PIPE
Original Filed April 5, 1930  2 Sheets-Sheet 1
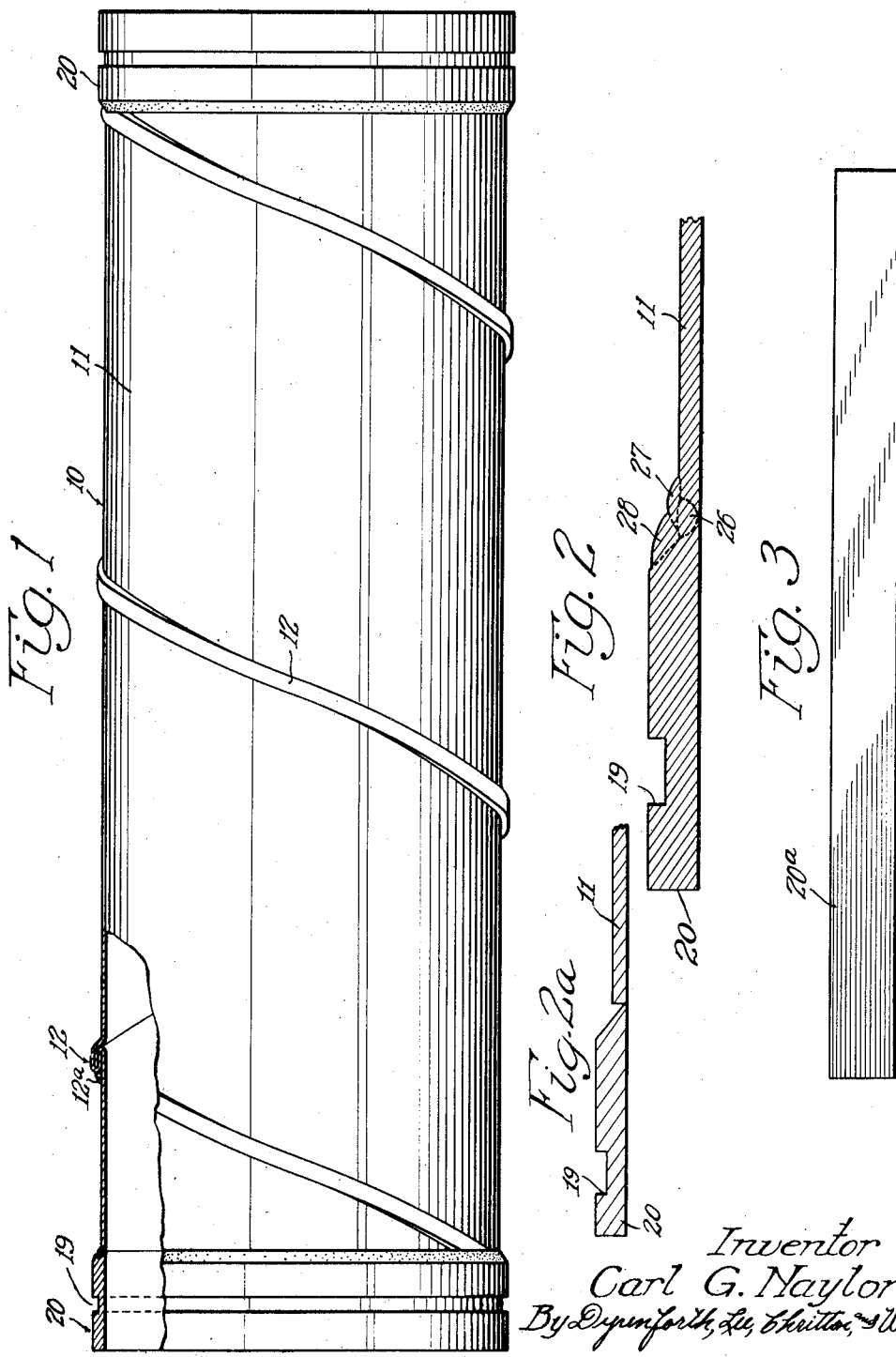
Inventor
Carl G. Naylor
By Dyrenforth, Lee, Chritton, & Wiles
Attys.

Jan. 9, 1934.    C. G. NAYLOR    1,943,035
METHOD OF PRODUCING TUBING OR PIPE
Original Filed April 5, 1930    2 Sheets-Sheet 2
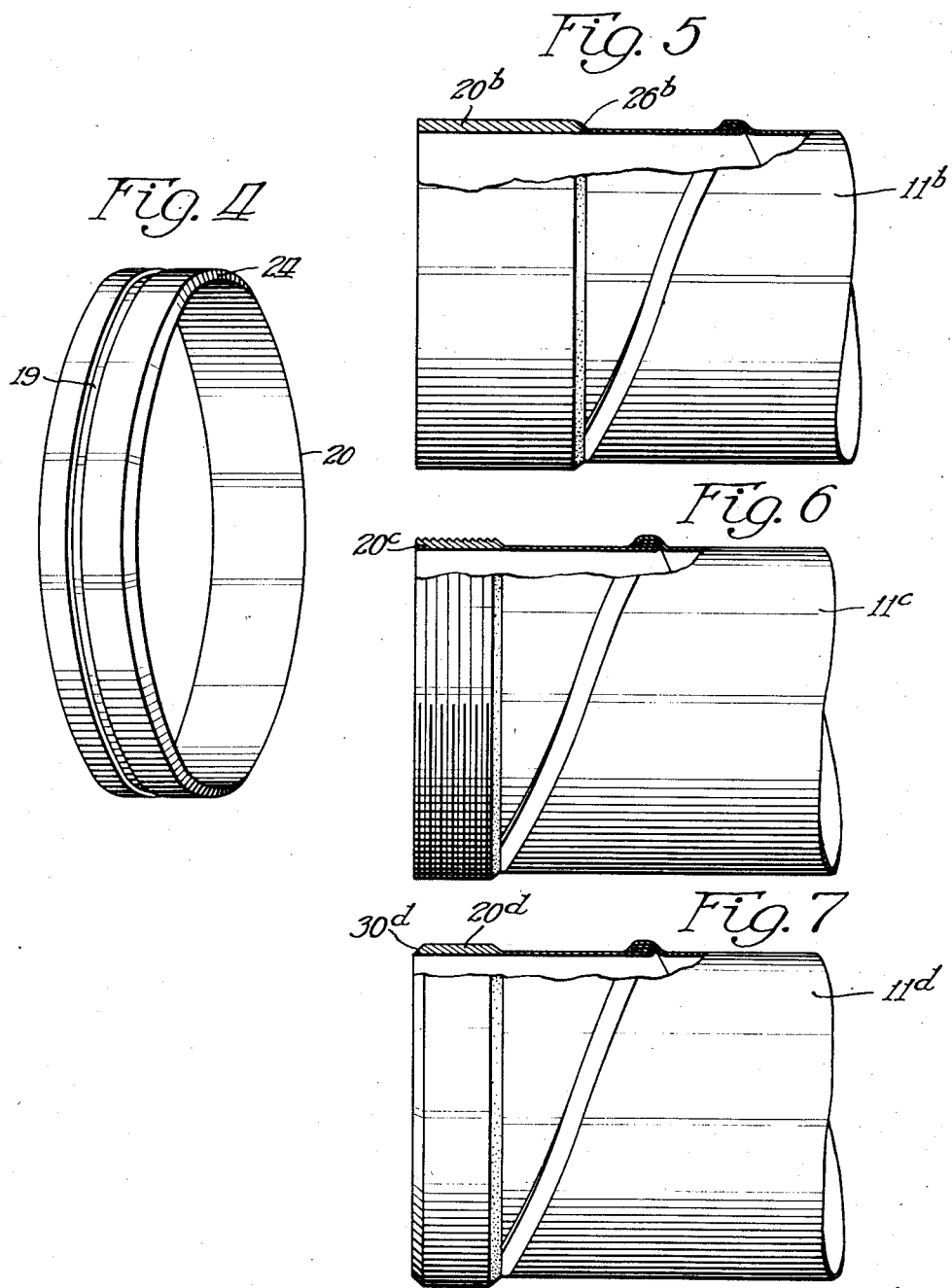

Patented Jan. 9, 1934

1,943,035

UNITED STATES PATENT OFFICE 1,943,035

METHOD OF PRODUCING TUBING OR PIPE

Carl G. Naylor, Chicago, Ill., assignor to Naylor Pipe Company, Chicago, Ill., a corporation of Illinois Original application April 5, 1930, Serial No. 441,885. Divided and this application January 9, 1931. Serial No. 507,686

4 Claims. (Cl. 113—33)

This invention relates to tubing or pipe, and has as its primary object the production of improved spiral pipe having end pieces welded thereto whereby lengths of the pipe may be connected to each other, or to standard pipe, by standard coupling devices.

Pipe of the kind described is usually formed from strips or ribbons of metal and has relatively thin walls so that its inside and outside dimensions cannot both conform to standard pipe dimensions. The usual practice is to produce pipe of this character having inside diameters that are standard. My invention contemplates producing such pipe provided with accurately formed end-pieces which permit lengths thereof to be secured to each other, or to standard pipe, by standard coupling devices.

One form of the invention is embodied in spiral pipe formed by winding a strip or ribbon of metal into spirally related convolutions having a lock-seam that is held in such manner that it becomes fluid-tight. The pipe is preferably formed with a standard inside diameter, but the wall is preferably too thin to have its outside diameter conform to the corresponding standard outside diameter. Welded to the spiral pipe thus formed are end-pieces that are preferably of standard pipe dimensions and are preferably formed in such manner that the inner and outer surfaces thereof are concentric.

Pipe embodying the preferred form of my invention can be produced economically in commercial quantities and has many advantages. Thus, while it is relatively strong, it has thin walls and is relatively light in weight. The improved annular end-pieces insure that several pieces of the pipe may be coupled quickly and easily to each other, or to standard pipe.

Many other objects and advantages will appear as this description progresses, reference being had to the accompanying drawings, wherein:

Figure 1 is a side elevation, partly in section, of a spiral pipe which embodies the invention, the pipe being provided with annular end-pieces of standard pipe dimensions.

Fig. 2 is an enlarged fragmentary longitudinal section taken through one end of the pipe shown in Fig. 1;

Fig. 2a is a section taken on the same line as Figure 2 showing the manner in which one of the annular end-pieces is assembled with one end of the pipe when it is to be welded thereto.

Fig. 3 is a blank from which one of the annular end-pieces is formed;

Fig. 4 is a perspective view of one of the annular end-pieces;

Fig. 5 is a fragmentary side elevation of a spiral pipe provided with annular end-pieces having standard inside and outside pipe dimensions, this embodiment being particularly adapted for bolted joints;

Fig. 6 is a fragmentary side elevation of a spiral pipe provided with shorter annular end-pieces having standard inside and outside pipe dimensions, the end-pieces employed in this instance being particularly adapted for use in connection with screw-threaded couplings, and Fig. 7 is a fragmentary elevation of a spiral pipe having annular end-pieces which have standard inside and outside pipe diameters and are particularly adapted to be welded to the end-pieces of a single piece, or to the ends of a standard pipe.

This application is a division of my co-pending application, Serial No. 441,885 filed April 5, 1930.

Referring to the drawings, the reference character 10 designates generally a spiral pipe which preferably comprises a body portion 11 formed by winding a ribbon or strip of metal around a mandrel, or any other suitable means, to provide a plurality of spirally related convolutions, the convolutions being rigidly secured to each other by a spiral lock-seam 12. Pipe formed in this manner is a commercial product and is employed for various purposes. The pipe has relatively thin walls and is constructed, in this instance, so that its inside diameter is a standard inside diameter for wrought iron pipe. The outer diameter of the pipe is less than the corresponding outside diameter of wrought iron pipe. The lock-seam 12 is preferably welded to the outer surface of the pipe as shown at 12a.

The pipe may be of any desired length and after it has been formed its ends are trimmed so that they lie in planes which are substantially at right angles to the longitudinal axis of the pipe. Welded to the ends of the pipe are annular end-pieces 20 which have inside and outside diameters corresponding to the standard inside and outside pipe diameters. In this instance the annular end-pieces are provided with annular grooves 19 so that pipe couplings of a certain type may be employed to connect lengths of the spiral pipe to each other, or to standard pipe. Each end-piece 20 is preferably provided with a chamfered or beveled edge 24 for a purpose which will presently appear.

The pipe couplings referred to in the preceding paragraph are pipe couplings which usually comprise two semi-circular members having inwardly extending arcuate ribs or flanges adapted to engage annular grooves formed in the ends of two pipes which are to be coupled to each other. A gasket of rubber is placed around the adjoining ends of the pipes. The semi-circular members are assembled to encircle the gasket and are then secured in place by bolts.

While, in some instances, I may employ sections of standard pipe for the end pieces 20, I prefer to form them from blanks or bars 20a, one of which is shown in Fig. 3. The reason for this preference is that the inside and outside surfaces of wrought iron pipe are not consistently concentric, and when grooves, screw-threads, etc., are cut therein one side of the pipe is weakened to such an extent that the use of such pipe sections as ends in connection with spiral pipe formed from steel does not insure a finished product that will have the usual factor of safety as far as its strength is concerned. Also, when a pipe section does not have substantially concentric inner and outer surfaces, the bond between such pipe sections and the spiral pipe is apt to be weak where the metal of the pipe section is relatively thin.

The annular end pieces 20 are preferably formed from the blanks 20a by first roughly forming each blank into a ring, after which each ring is placed in suitable apparatus (not shown) having members that exert pressure on the inner and outer surfaces of the ring and press it into true annular form. The ends of the blank from which the ring is formed are then welded to each other. The chamfered edge 24 and the groove 19 are then formed after which the ring or completed end-piece is welded to the spiral pipe, preferably by a machine of the type shown in my co-pending application, Serial No. 389,712, filed August 31, 1929, which machine preferably comprises welding apparatus of the metallic electrode type so that the metal of the electrode is deposited at the weld.

In welding the end-piece to one end of the spiral pipe, the chamfered edge 24 is positioned adjacent that end so that a substantially V-shaped annular groove is provided. (See Fig. 2a). This practice is advantageous as it makes it unnecessary to heat a relatively large quantity of metal on either side of the weld, the V-shaped groove being partly filled by the fused electrode and partly by fused metal from the pipe and end-piece.

The finished weld is preferably the result of a plurality of welding operations so that fused metal from the electrode is deposited a plurality of times. Obviously, a strong bond between the end-piece and the pipe is obtained and the joint is protected in such manner that there will be no failure thereof as the result of corrosion.

In Fig. 2, I have indicated by heavy dotted lines that the bond between the pipe and end-piece is preferably formed by three welding operations so that three welds 26, 27 and 28 are formed, weld 26 being formed first and the welds 27 and 28 being superimposed thereon. When the first welding operation is performed, the pipe and end-piece are relatively cool and the first weld would be relatively brittle, if it were not reheated during the second welding operation. Also, the weld would often be unsatisfactory as more or less holes would appear therein when it cooled and there would not be a fluid-tight seal between the end-piece and the pipes. By superimposing the second and third welds upon the first while the metal heating during the first welding operation is relatively hot, the metal in the bond and adjacent it is annealed so that it has a high factor of safety. This is an exceedingly important feature of the invention.

In Fig. 5, I have illustrated another form of the invention embodied in a pipe comprising a spiral pipe 11b having an end 20b welded thereto by a triple weld 26b, the end 20b being preferably formed from a blank similar to the blank 20a, but of different proportions. The end 20b is relatively long so that it is particularly adapted to be connected to a similar end on another pipe by a standard bolted connection, or coupling device. Of course, the inside and outside dimensions of the end-piece 20b are standard inside and outside pipe dimensions, respectively, and one edge of the end-piece is preferably chamfered as indicated.

In Fig. 6, I have shown a spiral pipe 11c having an annular end-piece 20c preferably constructed in the same manner as the above described end-piece 20, but proportioned for standard pipe. The end piece 20c is provided with threads so that it may be connected to screw-threaded standard pipe fittings.

Fig. 7 illustrates a spiral pipe 11d provided with an annular end piece 20d which has standard inside and outside pipe diameters. The end piece 20d is preferably constructed in the same manner as the end-piece 20, but its outer edge is chamfered, as at 30d, so that it may be connected securely to a similar end-piece (not shown) which is in part of another pipe. When the two end-pieces are brought into position for the welding operation a substantially V-shaped groove is provided for the same purpose that a V-shaped groove is provided when the end-piece 20 is welded to the spiral pipe 11.

The above described pipes embodying my invention are described only as examples, as the end-pieces may be made to fit any desired coupling device.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new, and desire to secure by Letters Patent, is:

1. A method of producing pipe with annular end pieces welded thereto, which method comprises forming a body portion by winding a strip of metal into spirally related convolutions, forming an annulus from a bar of metal and welding the ends of the bar to each other, and welding said annulus to said body portion.

2. A method of producing pipe with annular end pieces welded thereto, which method comprises forming a body portion by winding a strip of metal into spirally related convolutions, forming an annulus from a bar of metal and welding the ends of said bar to each other, cutting away one edge of said annulus to form an end surface thereon smaller than an end surface of said pipe, bringing said end surface on said annulus substantially into contact with the end surface of said pipe in such manner that an annular groove is formed between said annulus and said pipe, and then welding said annulus to said pipe by fusing added metal in said groove.

3. A method of producing pipe with annular end pieces welded thereto, which method comprises forming a body portion by winding a strip of metal into spirally related convolutions joined to each other by a spiral lock-seam, welding the lock-seam to the outer surface of the body portion, and welding an annular end piece to one end of said body portion.

4. A method of producing pipe with annular end pieces welded thereto, which method comprises forming a body portion by winding a strip of metal into spirally related convolutions joined to each other by a spiral lock-seam, welding said lock-seam to the outer surface of said body portion, bending a bar of metal into an annular end-piece, welding the ends of said bar to each other, and welding one edge of said annular end-piece to one end of said body portion.

CARL G. NAYLOR.